US010166512B2

(12) United States Patent
Ichikawa et al.

(10) Patent No.: US 10,166,512 B2
(45) Date of Patent: Jan. 1, 2019

(54) METHOD FOR CLEANING CERAMIC FILTER

(71) Applicant: NGK INSULATORS, LTD., Nagoya (JP)

(72) Inventors: Akimasa Ichikawa, Nagoya (JP); Hideyuki Suzuki, Nagoya (JP); Ichiro Wada, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 14/060,953

(22) Filed: Oct. 23, 2013

(65) Prior Publication Data

US 2014/0048482 A1    Feb. 20, 2014

(30) Foreign Application Priority Data

Apr. 25, 2011   (JP) .................... 2011-097250

(51) Int. Cl.
| | |
|---|---|
| *B01D 65/02* | (2006.01) |
| *B01D 63/06* | (2006.01) |
| *B01D 71/02* | (2006.01) |
| *B01D 61/36* | (2006.01) |

(52) U.S. Cl.
CPC ........... *B01D 65/02* (2013.01); *B01D 63/066* (2013.01); *B01D 61/362* (2013.01); *B01D 71/02* (2013.01); *B01D 2321/10* (2013.01); *B01D 2321/16* (2013.01); *B01D 2321/18* (2013.01)

(58) Field of Classification Search
CPC ..................................... B01D 65/02
USPC ....................................... 210/636
See application file for complete search history.

(56) References Cited

U.S. PATENT DOCUMENTS

| | | | | | |
|---|---|---|---|---|---|
| 4,340,403 | A | * | 7/1982 | Higuchi et al. ................. | 55/523 |
| 4,364,760 | A | * | 12/1982 | Higuchi et al. ................. | 55/523 |
| 4,629,483 | A | * | 12/1986 | Stanton ........................... | 55/487 |
| 4,914,065 | A | * | 4/1990 | Hijikata et al. ................ | 502/52 |
| 4,921,610 | A |   | 5/1990 | Ford et al. | |
| 4,957,625 | A | * | 9/1990 | Katoh et al. .................. | 210/119 |
| 5,214,020 | A | * | 5/1993 | Shimoda ....................... | 502/439 |
| 5,244,585 | A | * | 9/1993 | Sugimoto ..................... | 210/798 |
| 5,252,218 | A |   | 10/1993 | Muraldihara et al. | |
| 5,370,793 | A | * | 12/1994 | Sugimoto .................. | 210/195.1 |
| 5,549,725 | A | * | 8/1996 | Kasai et al. ..................... | 55/523 |

(Continued)

FOREIGN PATENT DOCUMENTS

| | | |
|---|---|---|
| CN | 1216720 A | 5/1999 |
| CN | 1703270 A | 11/2005 |

(Continued)

OTHER PUBLICATIONS

Translation of IPER from PCT/JP2012/060060—6 pages.*

(Continued)

*Primary Examiner* — Robert A Hopkins
(74) *Attorney, Agent, or Firm* — Burr & Brown, PLLC

(57) ABSTRACT

There is provided a method for cleaning a ceramic filter which can shorten an operation time required to clean the ceramic filter. The method for cleaning the ceramic filter includes: reducing a pressure of a space on a secondary side of the uncleaned ceramic filter, while supplying a cleaning medium to a space on a primary side of the uncleaned ceramic filter, thereby passing the cleaning medium through the ceramic uncleaned filter, so that the uncleaned ceramic filter is cleaned.

5 Claims, 2 Drawing Sheets

(56) References Cited

U.S. PATENT DOCUMENTS

| | | | |
|---|---|---|---|
| 5,584,990 A * | 12/1996 | Sugimoto | 210/138 |
| 5,632,890 A * | 5/1997 | Sugimoto | 210/167.11 |
| 5,855,781 A * | 1/1999 | Yorita et al. | 210/321.82 |
| 6,126,833 A * | 10/2000 | Stobbe et al. | 210/650 |
| 6,355,173 B1 * | 3/2002 | den Bieman et al. | 210/636 |
| 6,736,881 B2 * | 5/2004 | Leibold et al. | 95/280 |
| 6,830,679 B2 * | 12/2004 | Tsuihiji et al. | 210/87 |
| 6,991,737 B2 * | 1/2006 | Oyachi et al. | 210/767 |
| 7,445,123 B1 * | 11/2008 | Chiou | 210/415 |
| 7,547,342 B2 * | 6/2009 | Mizutani | 55/523 |
| 7,614,505 B2 * | 11/2009 | Isomura | 210/490 |
| 2002/0014156 A1 * | 2/2002 | Leibold et al. | 95/280 |
| 2004/0188332 A1 * | 9/2004 | Haydock | 210/106 |
| 2006/0011535 A1 | 1/2006 | Ikeda et al. | |
| 2006/0237038 A1 | 10/2006 | Jetten et al. | |
| 2007/0160825 A1 * | 7/2007 | Miyakawa et al. | 428/312.2 |
| 2007/0240396 A1 * | 10/2007 | Mizutani | 55/523 |
| 2008/0105627 A1 * | 5/2008 | Isomura | 210/791 |
| 2008/0209670 A1 * | 9/2008 | Kemmerzell et al. | 15/353 |
| 2009/0056288 A1 * | 3/2009 | Waldo | 55/294 |
| 2011/0100910 A1 * | 5/2011 | Johansen | B01D 39/2068 210/636 |
| 2013/0112075 A1 * | 5/2013 | Millner | 95/96 |
| 2013/0281732 A1 * | 10/2013 | Zaima et al. | 562/485 |
| 2013/0289303 A1 * | 10/2013 | Zaima | 562/408 |
| 2014/0048482 A1 * | 2/2014 | Ichikawa et al. | 210/636 |

FOREIGN PATENT DOCUMENTS

| | | | |
|---|---|---|---|
| CN | 101069790 A1 | 11/2007 | |
| EP | 1304157 | 4/2003 | |
| EP | 1832327 A2 * | 9/2007 | B01D 29/52 |
| JP | 04-131182 A1 | 5/1992 | |
| JP | 05-103957 A1 | 4/1993 | |
| JP | 06205912 A * | 7/1994 | |
| JP | 07-124448 A1 | 5/1995 | |
| JP | H08-229364 A | 9/1996 | |
| JP | 08-309165 A1 | 11/1996 | |
| JP | 2000-218294 A1 | 8/2000 | |
| JP | 3101027 B2 | 10/2000 | |
| JP | 2003-093856 A1 | 4/2003 | |
| JP | 2004-058022 A1 | 2/2004 | |
| JP | 2004-073950 A1 | 3/2004 | |
| JP | 2004-098002 A1 | 4/2004 | |
| JP | 3538513 B2 | 6/2004 | |
| JP | 2006-021202 A1 | 1/2006 | |
| JP | 2006-159144 A | 6/2006 | |
| JP | 2007-090249 A1 | 4/2007 | |
| JP | 2007-203210 A | 8/2007 | |
| JP | 4192205 B2 | 12/2008 | |
| WO | 01/03814 A1 | 1/2001 | |
| WO | 2004/037782 A1 | 5/2004 | |

OTHER PUBLICATIONS

International Search Report and Written Opinion dated Jun. 5, 2012.
Canadian Office Action, Canadian Application No. 2,834,420, dated Oct. 20, 2014 (5 pages).
Canadian Official Action, Canadian Application No. 2,834,420, dated Aug. 11, 2015 (5 pages).
Wang Qianping, et al., "$Al_2O_3$ Series Composite Microfiltration Membrane Preparation Study," Beijing: Chemical Industry Press, Nov. 2010, pp. 8 and 9.
Chinese Office Action and Search Report (Application No. 201280020555.1) dated Jan. 16, 2015 (with English translation).
European Search Report, European Application No. 12777654.0, dated Feb. 9, 2015 (5 pages).
English Translation of International Search Report and Written Opinion, International Application No. PCT/JP2012/060060, dated Jun. 5, 2012 (7 pages).
Singaporean Search Report and Written Opinion (Application No. 2013079405) dated Jan. 7, 2015.
Xu Nanping, "Inorganic Membrane Separation Technology and Application," *Chemical Industry Press*, Mar. 2003, pp. 144-145.
Chinese Office Action (Application No. 201280020555.1) dated Jan. 26, 2016 (with English translation).
Canadian Office Action, Canadian Application No. 2,834,420, dated Jun. 28, 2016 (4 pages).
Office Action from a corresponding European patent application (EP 12 777 654.0) dated Nov. 12, 2018, 5 pages.

* cited by examiner

METHOD FOR CLEANING CERAMIC FILTER

BACKGROUND OF THE INVENTION

1. Technical Field

The present invention relates to a method for cleaning a ceramic filter. More particularly, it relates to a method for cleaning a ceramic filter which can shorten an operation time required to clean the ceramic filter.

2. Description of Related Art

Heretofore, a ceramic filter has been used to selectively separate a predetermined component from a composition containing a plurality of components. As this ceramic filter is used, fouling substances in the above composition are gradually accumulated, which deteriorates a separation performance. Therefore, to recover the separation performance, a cleaning treatment is performed at a predetermined time.

As a method of the cleaning treatment (the cleaning method), a method of soaking a ceramic filter in a cleaning liquid (e.g., an organic solvent), a method of allowing a cleaning gas or liquid (e.g., an organic solvent) to flow in the ceramic filter, a method by so-called reverse cleaning and the like are known. Specifically, in the uncleaned ceramic filter, the fouling substances are accumulated, and the separation performance is deteriorated. To solve the problem, as the above cleaning method, there is known a method of allowing a cleaning medium such as an organic solvent to flow through a space on a primary side of the uncleaned ceramic filter, thereby removing the fouling substances adhering to the uncleaned ceramic filter, to clean the ceramic filter (see Patent Documents 1 and 3). Moreover, as the above cleaning method, there are known a cleaning method of allowing a gas in a dry state to flow through the primary side space (see Patent Document 2) and a cleaning method of allowing the cleaning liquid to permeate the primary side space from a secondary side space (see Patent Document 4). Furthermore, as the above cleaning method, there are also known a cleaning method of forming a membrane of a different material on the surface of a separation membrane (see Patent Document 5), and the like.

PRIOR ART DOCUMENT

Patent Documents

Patent Document 1: JP-B-3101027
Patent Document 2: JP-B-3538513
Patent Document 3: JP-A-H05-103957
Patent Document 4: JP-B-4192205
Patent Document 5: JP-A-2003-93856

SUMMARY OF THE INVENTION

Problem to be Solved by the Invention

However, in the cleaning methods disclosed in Patent Documents 1 and 3, fouling substances present in portions which do not come in contact with the heated gas or liquid are not easily decomposed (or dissolved), and hence it takes time to remove the fouling substances. In the cleaning method disclosed in Patent Document 2, the gas is only allowed to flow through a primary side space, and hence it takes time to remove the fouling substances in an analogous way as in the cleaning methods disclosed in Patent Documents 1 and 3. The cleaning method disclosed in Patent Document 4 is a method of allowing a cleaning solution to permeate a primary side space from a secondary side space (so-called reverse cleaning). This method is effective for cleaning a solid-liquid separation membrane in which pores of submicron levels are formed and an amount of a permeating composition including a component to be selectively separated and the other components is large. However, in a liquid-liquid separation membrane or a gas-gas separation membrane in which pores of nano levels are formed and the amount of the above permeating composition is small, the fouling substances eluted from the cleaning solution are stagnant in the secondary side space, and are not suitably discharged. Therefore, the cleaning treatment takes time. The cleaning method disclosed in Patent Document 5 is a method of forming a membrane of a different material on the surface of the separation membrane. In this method, a process of forming the membrane of the different material is added, and hence the cleaning becomes costly.

As described above, there has been the problem that a long operation time is required for cleaning a ceramic filter to recover the separation performance.

The present invention has been developed in view of such problems of the conventional technologies. An object thereof is to provide a method for cleaning a ceramic filter which can shorten an operation time required to clean the ceramic filter.

Means for Solving the Problem

According to the present invention, a method for cleaning a ceramic filter is provided as follows.

[1] A method for cleaning a ceramic filter, comprising: reducing a pressure of a space on a secondary side of the uncleaned ceramic filter, while supplying a cleaning medium to a space on a primary side of the uncleaned ceramic filter, thereby passing the cleaning medium through the uncleaned ceramic filter, so that the uncleaned ceramic filter is cleaned.

[2] The method for cleaning the ceramic filter according to the above [1], wherein a temperature of the cleaning medium is from 25 to 450° C.

[3] The method for cleaning the ceramic filter according to the above [1] or [2], wherein the pressure in the secondary side space is from 0.03 to 50 kPa.

Effect of the Invention

In the method for cleaning a ceramic filter of the present invention, "a pressure of a space on a secondary side of the uncleaned ceramic filter is reduced, while supplying a cleaning medium to a space on a primary side of the uncleaned ceramic filter". In this way, the cleaning medium is passed through the uncleaned ceramic filter, so that the uncleaned ceramic filter is cleaned. Therefore, in the method for cleaning the ceramic filter of the present invention, fouling substances adhering to the ceramic filter can be removed in a short time. Therefore, the operation time required to clean the ceramic filter can be shortened. That is, the separation performance of the ceramic filter can be recovered in a short time.

DETAILED DESCRIPTION OF THE INVENTION

Figure 1:
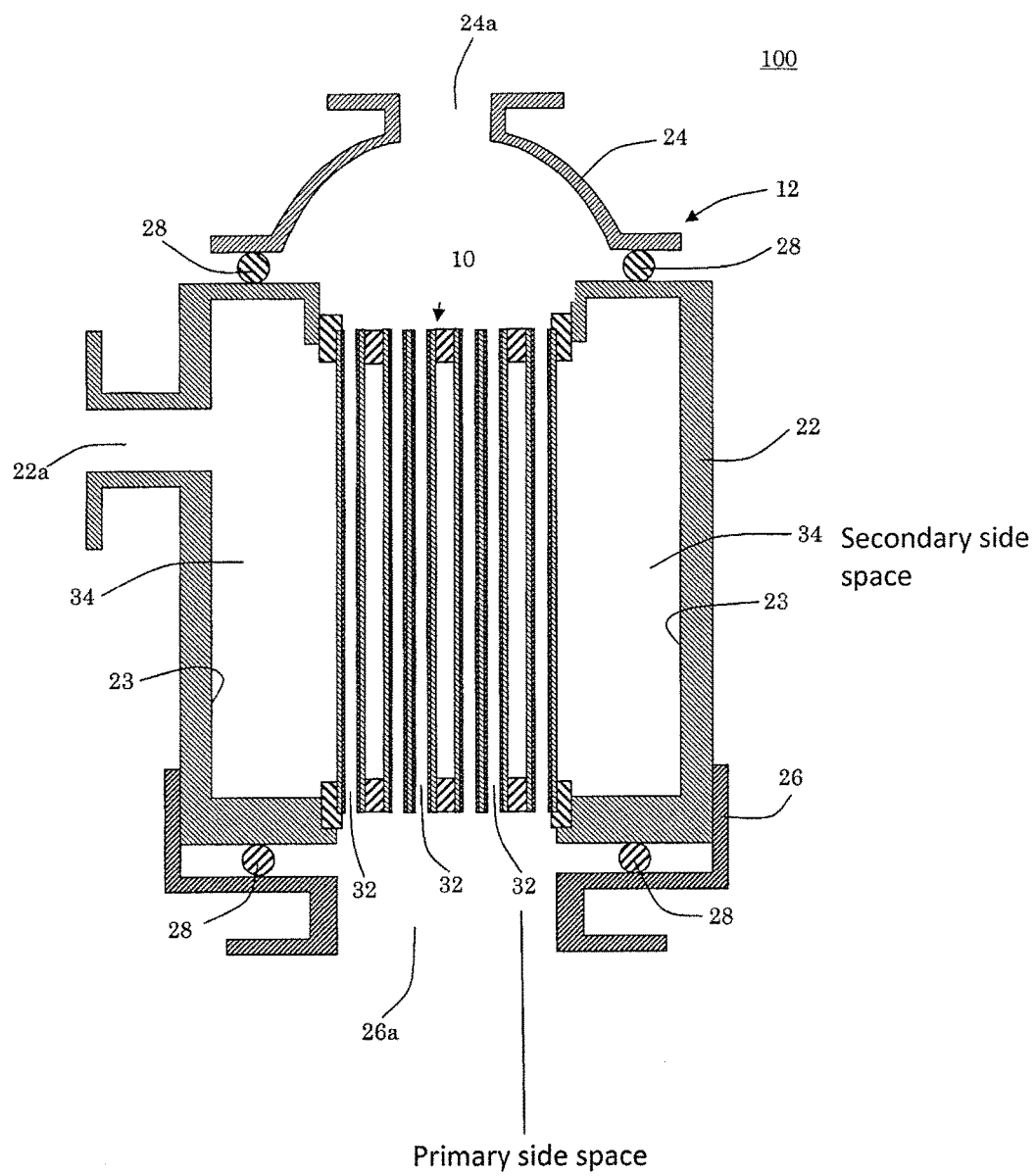
FIG. 1 is a cross sectional view schematically showing a separator (a filter unit) for use in one embodiment of a method for cleaning a ceramic filter of the present invention.

Hereinafter, embodiments of the present invention will specifically be described with reference to the drawings. It should be understood that the present invention is not limited to the following embodiments and that suitable modifications, improvements and the like added to the following embodiments on the basis of ordinary knowledge of a person skilled in the art without departing from the gist of the present invention also fall in the gist of the present invention.

Method for Cleaning Ceramic Filter:

In the method for cleaning the ceramic filter of the present invention, a pressure of a space on a secondary side of this uncleaned ceramic filter is reduced, while supplying a cleaning medium to a space on a primary side of the uncleaned ceramic filter. That is, the pressure (an absolute pressure) in the secondary side space is smaller than 101.3 kPa. Consequently, in the method for cleaning the ceramic filter of the present invention, the cleaning medium is passed through the uncleaned ceramic filter, so that the uncleaned ceramic filter is cleaned.

According to this method for cleaning the ceramic filter, "the pressure of the space on the secondary side of the uncleaned ceramic filter is reduced, while supplying the cleaning medium to the space on the primary side of the uncleaned ceramic filter". In this way, the cleaning medium is passed through the uncleaned ceramic filter, so that the uncleaned ceramic filter can be cleaned. Therefore, according to the method for cleaning the ceramic filter of the present invention, fouling substances can be removed in a short time. According to the present cleaning method, the cleaning medium flows into the secondary side space from the primary side space. Therefore, when the cleaning medium flows into the secondary side space, a physical force is applied to the fouling substances, and additionally, the cleaning medium can chemically decompose the fouling substances. For example, the cleaning medium dissolves the fouling substances. Therefore, the fouling substances present in the ceramic filter can suitably be removed. Consequently, as compared with a conventional cleaning method, an operation time required to clean the ceramic filter decreases. That is, the operation time can be shortened.

To "supply the cleaning medium to the space on the primary side of the ceramic filter" is to supply the cleaning medium to the space on the primary side of the ceramic filter so that the whole surface of a separation membrane of the ceramic filter on the side of the primary side space is covered with the cleaning medium.

"The primary side space" is a space to which a composition before separation has been supplied at the separation of the composition including a component (a separation object) to be selectively separated by the separation membrane (the ceramic filter) and components other than this separation object (hereinafter sometimes referred to as "the composition before the separation"). "The secondary side space" is a space into which the component separated from the composition before the separation by the separation membrane (i.e., the predetermined component selectively separated from the composition before the separation which includes the plurality of components) flows.

As described above, when the cleaning medium can flow into the secondary side space from the primary side space, the separation performance can be recovered by cleaning the ceramic filter in a short time. Moreover, when the cleaning medium is allowed to flow into the secondary side space from the primary side space, a predetermined difference (a pressure difference) may be made between the pressure in the primary side space and the pressure in the secondary side space.

Here, to make the above pressure difference, there is a method in which the above pressure difference is made by raising the pressure of the primary side space without reducing the pressure of the secondary side space. However, in this method, there might occur problems that the separation membrane is broken, that an excessive load is applied to a device (a liquid feed pump or the like) which supplies the cleaning medium into the primary side space to damage the device, and the like. Therefore, the above pressure difference may be made by reducing the pressure of the secondary side space.

FIG. 1 shows a separator 100 for use in one embodiment of the method for cleaning the ceramic filter of the present invention. The separator 100 is constituted of a ceramic filter 10 in which a plurality of pores are formed, and a casing 12 which can contain the ceramic filter 10. It is to be noted that the separator 100 shows a separator capable of selectively separating the predetermined component from the composition before the separation including the plurality of components by pervaporation. The method for cleaning the ceramic filter of the present invention can be applied to cleaning treatment of any separator. For example, it can suitably be employed in the cleaning treatment of a separator such as the separator 100 (a unit which performs the separation by pervaporation).

Figure 2:
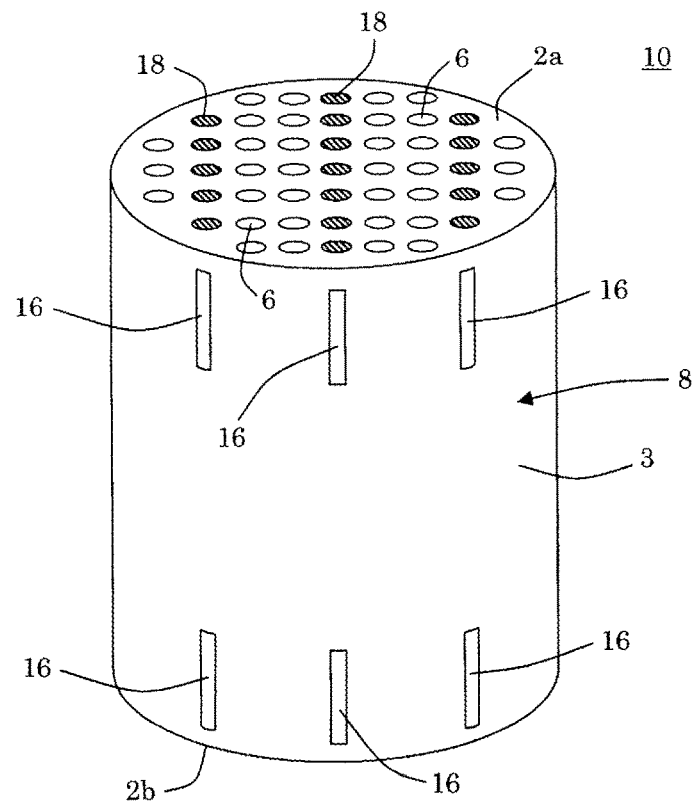
FIG. 2 is a perspective view schematically showing the ceramic filter included in the separator shown in FIG. 1.
Figure 3:
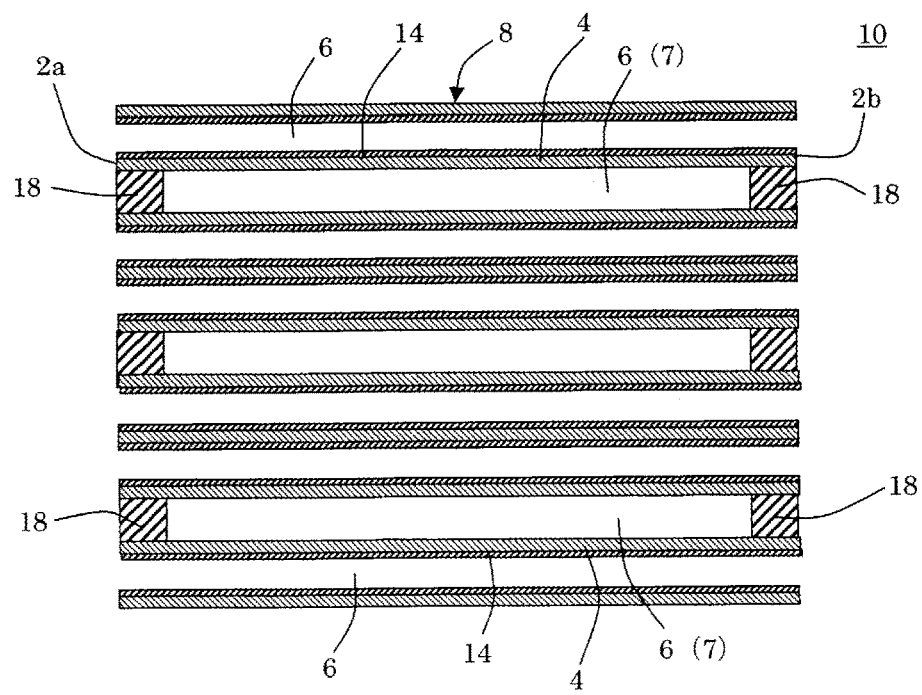
FIG. 3 is a schematic view showing a cross section parallel to a cell extending direction of the ceramic filter shown in FIG. 2.

As shown in FIG. 3, the ceramic filter 10 includes a porous support 8, and a separation membrane 14 formed on the surface of each of cells 6 of the porous support 8. The porous support 8 has partition walls 4 made of a porous body, and by the partition walls 4, the plurality of cells 6 are formed which extend through the filter from one end surface 2a to the other end surface 2b to become through channels of a fluid. In both end portions of the ceramic filter 10, water collecting slits 16 (see FIG. 2) are formed which communicate between one group of juxtaposed cells 6 and an exterior space of the ceramic filter 10. Moreover, in the ceramic filter 10, open frontal areas of both ends of each of the cells 6 which communicate with the water collecting slits 16 (water collecting cells 7) are plugged with plugged portions 18.

The casing 12 is constituted of a hollow tubular casing main body 22, an upper cap 24 attached to an upper end of the casing main body, and a bottom cap 26 attached to a lower end of the casing main body. In the vicinity of the upper end portion of the casing main body 22, a filtrate feed-out port 22a is formed through which the filtrate (the component to be selectively separated) can be fed out. In a top portion of the upper cap 24, an original solution discharge port 24a is formed through which the original solution (the unseparated composition) can be discharged. In a lower end portion of the bottom cap 26, an original solution supply port 26a is formed through which the original solution can be supplied to the ceramic filter 10. Flanges are disposed to these open portions, to obtain a structure which can easily be connected to pipes. Moreover, O-rings 28 made of an elastic material are interposed between the casing main body 22 and the upper cap 24 and between the casing main body 22 and the bottom cap 26, respectively. The casing 12 is preferably made of a material having water impermeability and high corrosion resistance (stainless steel or the like). The separator 100 shown in FIG. 1 may have a constitution where the original solution discharge port 24a is connected to the original solution supply port 26a via a pipe or the like (not shown), so that the original solution circulates.

FIG. 1 is a cross sectional view schematically showing the separator 100 for use in the one embodiment of the method for cleaning the ceramic filter of the present invention. FIG. 2 is a perspective view schematically showing the ceramic filter 10 included in the separator 100 shown in FIG. 1. FIG. 3 is a schematic view showing a cross section of the ceramic filter shown in FIG. 2 which is parallel to a cell extending direction.

When a predetermined component (a separation object A) is separated from an original solution by use of the separator 100, the separation object A is separated as follows. First, when the original solution is supplied at a predetermined pressure from the original solution supply port 26a of the bottom cap 26 to primary side spaces 32 in the cells 6 of the ceramic filter 10, the supplied original solution is filtered during the original solution permeates the partition walls 4 which define the cells 6. Afterward, the filtered original solution is discharged as the filtrate from an outer peripheral surface 3 of the ceramic filter 10 to a secondary side space 34 formed between the outer peripheral surface 3 of the ceramic filter 10 and an inner peripheral surface 23 of the casing main body 22. In this way, the ceramic filter 10 can selectively separate a predetermined substance from a mixture containing two or more substances. Such a ceramic filter can selectively separate a predetermined substance from the original solution. However, due to use (by selectively separating the predetermined substance from the original solution), impurities (the fouling substances) and the like in the original solution are deposited in the ceramic filter, and hence the separation performance deteriorates. Therefore it is necessary to remove the deposited impurities and the like by the cleaning treatment, thereby recovering the separation performance.

The porous support of the ceramic filter is made of a ceramic material, and as the porous support, a tubular support or a monolithic support can be used. A tubular porous support is a structure having a tubular wall made of a ceramic porous material, and including a single cell defined by the wall which extends through a central portion. A monolithic porous support is a honeycomb structure having lattice-like partition walls made of ceramic porous material, and including a large number of cells defined by the partition walls. Among these, the monolithic porous support is preferable since it has a large separation area per unit volume and a high treatment capacity. The porous support 8 of the ceramic filter 10 shown in FIG. 2 and FIG. 3 is an example of the monolithic porous support.

As the ceramic material constituting the porous support, for example, alumina ($Al_2O_3$), titania ($TiO_2$), mullite ($Al_2O_3 \cdot SiO_2$), zirconia ($ZrO_2$) or the like is used. Among these materials, alumina is preferable from the viewpoints that a raw material having controlled particle diameters is easily obtained, a stable slurry can be formed and the corrosion resistance is high. It is to be noted that the ceramic material has a high reliability due to its excellent mechanical strength and durability, a low deterioration during cleaning treatment by acid, alkali or the like, and an ability to precisely control the average pore diameter which determines the separation performance.

The porous support may include a base material in which a plurality of cells are formed, and a surface layer which is formed on the surfaces of the cells of this base material (the surfaces of partition walls forming the cells) and in which pores having an average pore diameter smaller than an average pore diameter of the base material and larger than an average pore diameter of the separation membrane are formed. The base material has the partition walls made of a porous body, and by the partition walls, the plurality of cells are formed which extend through the porous support from one end surface to the other end surface to become through channels of a fluid. It is to be noted that the surface layer may be constituted of one layer or may be constituted of multiple layers. The porous support includes the surface layer, and hence when the separation membrane is formed, aggregate particles in a slurry to form the separation membrane can be trapped by the surface layer. Therefore, it is possible to prevent a situation where the aggregate particles enter the insides of the pores of the base material. The base material and the surface layer can be made of the same material (the ceramic material) as in the porous support.

The average pore diameter of the porous support (the base material when the porous support has a surface layer) is determined in consideration of a balance between the mechanical strength and an amount of permeation. Usually, the porous support having an average pore diameter of about 1 to several hundred μm is used. When the porous support has a surface layer, the average pore diameter of the surface layer is smaller than the average pore diameter of the base material and larger than the average pore diameter of the separation membrane. Specifically, the average pore diameter is from about 0.01 to 10 μm. The average pore diameter of the porous support is a value measured by a mercury porosimeter. The average pore diameter of the surface layer is a value measured by an air flow method described in ASTM F316.

In the separation membrane, a plurality of pores is formed, and the predetermined substance can selectively be separated from the mixture containing two or more substances (i.e., solid-liquid separation, liquid-liquid separation or gas-gas separation can be accomplished). In the present invention, there is not any further special restriction on such a separation, and examples of the separation membrane include a zeolite membrane, a carbon membrane, a silica membrane, and an NF membrane (a nano filter). Specifically, examples of the zeolite membrane include zeolite membranes of A-type, Y-type, DDR type and MFI type.

The average pore diameter of the separation membrane can suitably be determined in accordance with the required separation performance. For example, in the case of a ceramic filter for use in precision filtration or ultra filtration, the average pore diameter is preferably from 0.01 to 1.0 μm. The average pore diameter of this separation membrane is a value measured by the air flow method described in ASTM F316.

The plugged portions can be made of the same material as in the porous support, and an average pore diameter is preferably from 1 to several hundred μm.

As the ceramic filter, there can be used a ceramic filter in which both end surfaces of a porous support (portions other than open frontal areas of cells) are coated with a coating membrane made of a water-impermeable material such as glass. This coating membrane can prevent the unseparated composition and the component which has permeated the separation membrane (the component selectively separated from the unseparated composition) from being mixed.

Examples of a cell shape (the shape in a cross section perpendicular to a fluid flowing direction) include a round shape, a quadrangular shape, a hexagonal shape and a triangular shape. Among these shapes, the round shape is preferable from the viewpoint that a separation membrane having a uniform membrane thickness can be formed.

There is not any special restriction on a shape of the ceramic filter, as long as the separation performance of the ceramic filter is not disturbed. Examples of the whole shape include a columnar shape, a quadrangular pillar shape, and a triangular pillar shape. Among these shapes, the columnar shape is preferable from the viewpoints that extrusion forming is easily performed, firing deformation rarely occurs, and sealing with the casing is easily accomplished. In the case of a columnar ceramic filter, a dimension thereof can be, for example, an outer diameter of 10 to 1000 mm and a length of 10 to 10000 mm.

The cleaning medium includes a cleaning liquid and a cleaning gas. Examples of the cleaning liquid include organic solvents such as alcohol, ketone, ether and ester; water; acid; alkali; and mixed liquids of the water and the above organic solvents. Moreover, examples of the cleaning gas include atmospheric air, steam, an inert gas, an acidic gas, and a basic gas.

A temperature of the cleaning medium is preferably from 25 to 450° C., and further preferably from 50 to 400° C. When the temperature of the cleaning medium is in the above range, the fouling substances can be heated and decomposed. Therefore, the cleaning treatment can be performed more effectively (i.e., in a shorter time). Here, "the temperature of the cleaning medium" means the temperature of the cleaning medium when the cleaning medium is supplied to the ceramic filter.

The temperature of the cleaning medium is preferably from 25 to 450° C., and further preferably from 50 to 400° C. as described above, however a more preferable temperature of the cleaning medium can suitably be set in accordance with a type of the cleaning gas. Specifically, when the atmospheric air is used as the cleaning gas, a temperature of the atmospheric air (the cleaning gas) is preferably from 200 to 300° C. Moreover, when the inert gas is used as the cleaning gas, a temperature of the inert gas (the cleaning gas) is preferably 300° C. or more.

Furthermore, when the atmospheric air of 200 to 300° C. is used as the cleaning gas, the pressure in the secondary side space is preferably from 0.03 to 50 kPa.

When the inert gas of 300° C. or more is used as the cleaning gas, the pressure in the secondary side space is preferably from 0.03 to 50 kPa.

When the carbon membrane is used as the separation membrane, the inert gas of 300° C. or more is preferably used as the cleaning medium. By using the inert gas as the cleaning medium, the cleaning medium can be prevented from reacting with the carbon membrane.

When the silica membrane or the A-type zeolite membrane is used as the separation membrane, the organic solvent, the atmospheric air or the inert gas is preferably used as the cleaning medium. By using the organic solvent, the atmospheric air or the inert gas as the cleaning medium, the separation membrane can be prevented from being dissolved by the cleaning medium.

The pressure (a gauge pressure) in the primary side space at the cleaning treatment is preferably from 100 to 1000 kPa, further preferably from 100 to 500 kPa, and especially preferably from 100 to 200 kPa. When the pressure in the primary side space is out of the above range, the separation membrane might be broken by the pressure. That is, when the pressure in the primary side space is in the above range, the separation membrane can be prevented from being broken by the pressure.

A linear speed of the cleaning medium to be supplied to the primary side space is preferably from 0.01 to 1000 cm/second, further preferably from 0.1 to 1000 cm/second, and especially preferably from 1 to 1000 cm/second. When the above linear speed is in the above range, the fouling substances are easily dissolved in the cleaning medium. Therefore, the operation time required for the cleaning can further be shortened.

In the present invention, there is not any special restriction on a degree of the pressure reduction, as long as the cleaning medium flows into the secondary side space from the primary side space at the cleaning treatment by reducing the pressure of the secondary side space of the uncleaned ceramic filter, and the degree can suitably be set. The pressure in the secondary side space is preferably from 0.03 to 50 kPa, further preferably from 0.1 to 10 kPa, and especially preferably from 0.1 to 1 kPa. When the pressure in the secondary side space is in the above range in this way, a removal speed of the fouling substances is fast. That is, the fouling substances are easily dissolved in the cleaning medium, and hence the operation time required for the cleaning can further be shortened.

As a method of reducing the pressure of the secondary side space, a heretofore known method can suitably be employed. An example of the method is a method using a vacuum pump or the like.

In the method for cleaning the ceramic filter of the present invention, the cleaning treatment may be performed by using the cleaning liquid or the cleaning gas or by combining the cleaning liquid and the cleaning gas. That is, the cleaning treatment may be performed by using the cleaning liquid and then performed by using the cleaning gas, or the cleaning treatment may be performed by using the cleaning gas and then performed by using the cleaning liquid. Furthermore, the cleaning treatment may be performed by using a first cleaning liquid (or a first cleaning gas) and then performed by using a second cleaning liquid (or a second cleaning gas). For example, after performing the cleaning treatment by use of an organic solvent such as ethanol as the first cleaning liquid (after dissolving the fouling substances), the cleaning treatment may be performed by using water as the second cleaning liquid.

EXAMPLES

Hereinafter, the present invention will specifically be described with respect to examples, but the present invention is not limited to these examples.

Example 1

A porous surface layer made of alumina particles (an average pore diameter of 0.1 µm) was formed on the surfaces of a plurality of cells of a monolithic (a cell diameter of 2.5 mm) porous base material (made of alumina) having a columnar shape (a diameter of 3 cm and a length of 16 cm), to prepare a monolithic porous support.

An A-type zeolite membrane (a membrane thickness of 5 µm) was formed on the surfaces of a plurality of cells (i.e., the surface of the surface layer) of the prepared monolithic porous support by hydrothermal synthesis, to obtain a ceramic filter.

A separation object (an unseparated composition) was subjected to pervaporation separation by use of the obtained ceramic filter. As the separation object, a mixture (including 0.1% of cutting oil as an impurity) of water (separation object A) and isopropyl alcohol (IPA) (separation object B) was used. As pervaporation separation conditions, conditions of 70° C. and 5 kPa were used, and the pervaporation separation was performed until a permeation coefficient of the water (separation object A) decreased to 60% of that immediately after the start of the separation. Afterward, the ceramic filter after the pervaporation separation (before cleaning) (i.e., the ceramic filter whose permeation coefficient decreased to 60% of that immediately after the start of the separation) was subjected to a cleaning treatment.

The cleaning treatment was performed by reducing the pressure of the secondary side space (setting the pressure in the secondary side space to 5 kPa), while supplying atmospheric air heated at 350° C. to a primary side space of the ceramic filter at a linear speed (a primary side linear speed) of 20 cm/second, and allowing the atmospheric air of the primary side space to flow into the secondary side space. The cleaning treatment time was one hour.

As a result of the cleaning treatment, the permeation coefficient of the water (separation object A) after the cleaning treatment was 5200 nmol/Pa·m²·s, and a recovery ratio was 100%.

In Table 1, "separation object (A/B)" indicates that a mixture of A and B was subjected to the separation. It is to be noted that in the column of "the separation object (A/B)", for example, "water/IPA=10/90" indicates that a mixture of water (separation object A) and isopropyl alcohol (separation object B) at a mixture ratio (parts by mass) of 10:90 was used. It is to be noted that "the cutting oil" is "Daphne Magplus LA30" manufactured by Idemitsu Kosan Co., Ltd. "Test conditions" indicate the conditions of the separation (pervaporation separation, gas separation). "Before the test" of the column of "permeation coefficient of the separation object A" indicates the permeation coefficient of the separation object A in the ceramic filter immediately after the start of the separation (the pervaporation separation or the gas separation). "After the test" of the column of "permeation coefficient of the separation object A" indicates the permeation coefficient of the separation object A in the ceramic filter after the separation was performed until the permeation coefficient decreased to 60% of that immediately after the start of the separation (the pervaporation separation or the gas separation). "A primary side" indicates a cleaning medium supplied to the primary side space of the ceramic filter. "A primary side linear speed" indicates the linear speed (cm/second) of the cleaning medium supplied to the primary side space of the ceramic filter. "A secondary side" indicates the pressure of the secondary side space in the cleaning treatment. "A reduced pressure" indicates that the pressure of the secondary side space is reduced in the cleaning treatment (in parentheses, the pressure in the secondary side space is indicated). "temp." indicates the temperature of the cleaning medium when the cleaning treatment is performed. "Time" indicates hours for which the cleaning treatment is performed.

TABLE 1

| | | Preparation of deteriorated membrane | | | | |
|---|---|---|---|---|---|---|
| | | Separation object (A/B) | | Permeation coefficient of separation object A (nmol/Pa · m² · s) | | Washing treatment Washing treatment conditions |
| | Separation membrane | Added impurity concentration in ( ) | Test conditions | Before test | After test | Primary side |
| Example 1 | A-type zeolite membrane | Water/IPA = 10/90 (cutting oil 0.1%) | 70° C.-5 kPa | 5200 | 3120 | Atmospheric air |
| Example 2 | DDR type zeolite membrane | $H_2/CH_4$ = 50/50 (steam 0.1%) | 25° C.-0.1 MPa | 100 | 60 | Atmospheric air |
| Example 3 | Carbon membrane | Water/IPA = 10/90 (cutting oil 0.1%) | 70° C.-5 kPa | 4000 | 2400 | Nitrogen |
| Example 4 | Carbon membrane | Water/ethyl acetate = 3/97 (Acetic acid 0.1%) | 70° C.-5 kPa | 6000 | 3600 | Steam |
| Example 5 | Carbon membrane | Methanol/Acetonee = 10/90 | 50° C.-1 kPa | 1700 | 1000 | Water |
| Example 6 | Silica membrane | Water/IPA = 10/90 (cutting oil 0.1%) | 70° C.-5 kPa | 4200 | 2500 | Ethanol |
| Example 7 | Silica membrane | Water/THF = 10/90 | 50° C.-1 kPa | 3600 | 2100 | Acetone |
| Example 8 | Silica membrane | Water/THF = 10/90 | 50° C.-1 kPa | 3600 | 2100 | Acetone |
| Example 9 | Silica membrane | Water/THF = 10/90 | 50° C.-1 kPa | 3600 | 2100 | Acetone |
| Example 10 | A-type zeolite membrane | Water/IPA = 10/90 (cutting oil 0.1%) | 70° C.-5 kPa | 5200 | 3120 | Atmospheric air |
| Example 11 | A-type zeolite membrane | Water/IPA = 10/90 (cutting oil 0.1%) | 70° C.-5 kPa | 5200 | 3120 | Atmospheric air |
| Example 12 | A-type zeolite membrane | Water/IPA = 10/90 (cutting oil 0.1%) | 70° C.-5 kPa | 5200 | 3120 | Atmospheric air |
| Example 13 | A-type zeolite membrane | Water/IPA = 10/90 (cutting oil 0.1%) | 70° C.-5 kPa | 5200 | 3120 | Atmospheric air |

TABLE 1-continued

| | | | | | | |
|---|---|---|---|---|---|---|
| Comparative Example 1 | Silica membrane | Water/IPA = 10/90 (cutting oil 0.1%) | 70° C.-5 kPa | 4200 | 2500 | Ethanol |
| Comparative Example 2 | Silica membrane | Water/IPA = 10/90 (cutting oil 0.1%) | 70° C.-5 kPa | 4200 | 2500 | Ethanol |

| | Washing treatment | | | | | |
|---|---|---|---|---|---|---|
| | Washing treatment conditions | | | | Permeation coefficient of | |
| | Primary side linear speed (cm/second) | Secondary side | Temp. (° C.) | Time (hours) | separation object A after washing treatment (nmol/Pa · m² · s) | Recovery ratio (%) |
| Example 1 | 20 | Reduced pressure (5 kPa) | 350 | 1 | 5200 | 100 |
| Example 2 | 200 | Reduced pressure (10 kPa) | 350 | 1 | 98 | 95 |
| Example 3 | 200 | Reduced pressure (10 kPa) | 400 | 1 | 4000 | 100 |
| Example 4 | 20 | Reduced pressure (1 kPa) | 200 | 3 | 5900 | 96 |
| Example 5 | 200 | Reduced pressure (50 kPa) | 100 | 1 | 1700 | 100 |
| Example 6 | 20 | Reduced pressure (1 kPa) | 130 | 1 | 4200 | 100 |
| Example 7 | 2 | Reduced pressure (0.1 kPa) | 25 | 3 | 3500 | 93 |
| Example 8 | 2 | Reduced pressure (0.1 kPa) | 25 | 1 | 3400 | 87 |
| Example 9 | 2 | Reduced pressure (0.1 kPa) | 23 | 1 | 3100 | 67 |
| Example 10 | 20 | Reduced pressure (5 kPa) | 420 | 1 | 5200 | 100 |
| Example 11 | 20 | Reduced pressure (5 kPa) | 450 | 1 | 4600 | 71 |
| Example 12 | 20 | Reduced pressure (0.07 kPa) | 350 | 1 | 5200 | 100 |
| Example 13 | 20 | Reduced pressure (0.03 kPa) | 350 | 1 | 4600 | 71 |
| Comparative Example 1 | 20 | Ordinary pressure (101.3 kPa) | 130 | 10 | 3200 | 41 |
| Comparative Example 2 | 20 | Ordinary pressure (101.3 kPa) | 130 | 100 | 4200 | 100 |

IPA: isopropyl alcohol
H$_2$: hydrogen
CH$_4$: methane
THF: tetrahydrofuran

[Recovery Ratio (%)]

The recovery ratio was calculated from an equation: the recovery ratio=(the permeation coefficient after the cleaning treatment−the permeation coefficient after the test)/(the permeation coefficient before the test−the permeation coefficient after the test)×100. In the above equation, "the permeation coefficient after the cleaning treatment" is the permeation coefficient of the separation object A after the cleaning treatment (in Table 1, described as "the permeation coefficient of the separation object A after the cleaning treatment"). "The permeation coefficient after the test" is the permeation coefficient of the separation object A in the ceramic filter, after the separation is performed until the permeation coefficient decreases to 60% of that immediately after the start of the separation (in Table 1, described in the column of "after the test" of "the permeation coefficient of the separation object A"). "The permeation coefficient before the test" is the permeation coefficient of the separation object A in the ceramic filter immediately after the start of the separation (in Table 1, described in the column of "before the test" of "the permeation coefficient of the separation object A").

Examples 2 to 13 and Comparative Examples 1 and 2

In Examples 2 to 13 and Comparative Examples 1 and 2, monolithic porous supports similar to the monolithic porous support prepared in Example 1 were used. Then, on the surfaces of the cells of the monolithic porous supports, respective separation membranes shown in Table 1 (a DDR-type zeolite membrane (a membrane thickness of 5 μm), a carbon membrane (a membrane thickness of 1 μm), a silica membrane (a membrane thickness of 1 μm) or an A-type zeolite membrane (a membrane thickness of 5 μm)) were formed, to prepare the ceramic filters. The prepared ceramic filters were used, mixtures shown in Table 1 (separation objects) were subjected to separation on test conditions shown in Table 1, and then a cleaning treatment was performed on conditions shown in Table 1. Except for the above procedures, the cleaning treatment was performed, a permeation coefficient of water after the cleaning treatment (the separation object A) was obtained, and a recovery ratio (%) was calculated, in the same manner as in Example 1. The results are shown in Table 1.

Additionally, the DDR type zeolite membrane of Example 2 was prepared by hydrothermal synthesis.

Each of the carbon membranes of Examples 3 to 5 was prepared by dip-forming a membrane of a polymer solution as a precursor, and then carbonizing the membrane in a reduction atmosphere.

Each of the silica membranes of Examples 6 to 9 and Comparative Examples 1 and 2 was prepared by dip-forming a membrane of a TEOS (tetraethyl orthosilicate) solution as a precursor, and then firing the membrane in a reduction atmosphere.

In Examples 1 to 4, 6 and 10 to 13 and Comparative Examples 1 and 2, cleaning mediums were gases, and in Examples 5 and 7 to 9, the cleaning mediums were liquids.

As it is clear from Table 1, it was possible to confirm that in a method for cleaning a ceramic filter of each of Examples 1 to 13, the operation time required to clean the ceramic filter can be shortened, as compared with a method for cleaning a ceramic filter of each of Comparative Examples 1 and 2. Specifically, when the cleaning treatment was performed by reducing the pressure of the secondary side space of the ceramic filter, it was possible to obtain a sufficient cleaning effect even in a short cleaning treatment time. On the other hand, in each of Comparative Examples 1 and 2, a long time was required for the cleaning treatment.

In Comparative Example 2, the recovery ratio was 100%, but the cleaning treatment was performed for 100 hours. Therefore, it is seen that the cleaning treatment for a very long time is required in Comparative Example 2.

INDUSTRIAL APPLICABILITY

In a method for cleaning a ceramic filter of the present invention, the ceramic filter can suitably be cleaned.

DESCRIPTION OF REFERENCE NUMERALS

2a: one end surface, 2b: the other end surface, 3: outer peripheral surface, 4: partition wall, 6: cell, 7: water collecting cell, 8: porous support, 10: ceramic filter, 12: casing, 14: separation membrane, 16: water collecting slit, 18: plugged portion, 22: casing main body, 22a: filtrate feed-out port, 23: inner peripheral surface, 24: upper cap, 24a: original solution discharge port, 26: bottom cap, 26a: original solution supply port, 28: O-ring, 32: primary side space, 34: secondary side space, and 100: separator.

The invention claimed is:

1. A method for cleaning a ceramic filter, comprising:
reducing a pressure of a space on a secondary side of an uncleaned ceramic filter containing fouling substances, while supplying a cleaning medium to a space on a primary side of the uncleaned ceramic filter, thereby passing the cleaning medium through the uncleaned ceramic filter, so that the uncleaned ceramic filter is cleaned by removing the fouling substances,
wherein a temperature of the cleaning medium is from 25 to 450° C., and the pressure in the secondary side space is from 0.03 to 50 kPa.

2. The method for cleaning the ceramic filter according to claim 1, wherein the cleaning medium chemically decomposes the fouling substances.

3. The method for cleaning the ceramic filter according to claim 1, wherein the ceramic filter includes a zeolite membrane, a carbon membrane, a silica membrane or a nano filter membrane.

4. The method for cleaning the ceramic filter according to claim 1, wherein the cleaning medium is an organic solvent, atmospheric air or an inert gas.

5. The method for cleaning the ceramic filter according to claim 1, wherein the ceramic filter comprises a porous support having one or more cells and a separation membrane formed on a surface of each of the cells, and wherein an average pore diameter of the separation membrane is from 0.01 to 1.0 μm.

* * * * *

UNITED STATES PATENT AND TRADEMARK OFFICE
CERTIFICATE OF CORRECTION

PATENT NO. : 10,166,512 B2
APPLICATION NO. : 14/060953
DATED : January 1, 2019
INVENTOR(S) : Akimasa Ichikawa, Hideyuki Suzuki and Ichiro Wada It is certified that error appears in the above-identified patent and that said Letters Patent is hereby corrected as shown below:

On the Title Page

Related U.S. Application Data, Item (63):
Please add: "Continuation of Application No. PCT/JP2012/060060 filed April 12, 2012."

Signed and Sealed this
Fifth Day of March, 2019

Andrei Iancu
*Director of the United States Patent and Trademark Office*